United States Patent
Li et al.

(10) Patent No.: US 8,229,438 B2
(45) Date of Patent: Jul. 24, 2012

(54) METHOD FOR INTER-SYSTEM HANDOVER

(75) Inventors: Shijun Li, Shenzhen (CN); Yongli Jia, Shenzhen (CN); Lijun Pu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1057 days.

(21) Appl. No.: 11/969,004

(22) Filed: Jan. 3, 2008

(65) Prior Publication Data

US 2008/0102837 A1    May 1, 2008

Related U.S. Application Data

(63) Continuation of application No. PCT/CN2006/001609, filed on Jul. 7, 2006.

(30) Foreign Application Priority Data

Jul. 8, 2005 (CN) .......................... 2005 1 0082700
Jul. 8, 2005 (CN) .......................... 2005 1 0082801

(51) Int. Cl.
*H04W 36/00* (2009.01)
(52) U.S. Cl. ..... 455/438; 455/436; 455/437; 455/552.1; 370/331
(58) Field of Classification Search .......... 455/436–442, 455/552.1; 370/328, 331
See application file for complete search history.

(56) References Cited

U.S. PATENT DOCUMENTS

| | | | |
|---|---|---|---|
| 5,432,843 A * | 7/1995 | Bonta | 455/438 |
| 5,737,703 A * | 4/1998 | Byrne | 455/442 |
| 6,167,269 A * | 12/2000 | Kondo | 455/437 |
| 6,236,860 B1 * | 5/2001 | Hagting et al. | 455/436 |
| 6,567,666 B2 | 5/2003 | Czaja et al. | |
| 6,594,242 B1 | 7/2003 | Kransmo | |
| 6,725,039 B1 | 4/2004 | Parmar et al. | |
| 6,725,058 B2 * | 4/2004 | Rinne et al. | 455/553.1 |
| 6,804,519 B1 | 10/2004 | Czaja et al. | |
| 6,963,745 B2 * | 11/2005 | Singh et al. | 455/437 |
| 6,983,147 B1 * | 1/2006 | Hans et al. | 455/436 |
| 7,257,403 B2 * | 8/2007 | Nikkelen | 455/436 |

(Continued)

FOREIGN PATENT DOCUMENTS

CN            1260648 A        7/2000

(Continued)

OTHER PUBLICATIONS

Written Opinion of the International Searching Authority in corresponding PCT Application No. PCT/CN2006/001609 (Oct. 26, 2006).

(Continued)

*Primary Examiner* — Sharad Rampuria
(74) *Attorney, Agent, or Firm* — Leydig, Voit & Mayer, Ltd.

(57) ABSTRACT

A method for inter-system handover is provided by the present invention, including: changing a first handover-related information into a second handover-related information, wherein the first handover-related information is supported by a serving communication system and the second handover-related information is supported by a target communication system; and handing over the user terminal from the serving communication system to the target communication system based on the second handover-related information. An apparatus for inter-system handover is also provided. The present invention can insure successful handover of user terminals from a serving communication system to a target communication system.

14 Claims, 3 Drawing Sheets

U.S. PATENT DOCUMENTS

| | | | |
|---|---|---|---|
| 7,289,808 B1* | 10/2007 | Uskela | 455/436 |
| 7,640,036 B2* | 12/2009 | Kallio | 455/552.1 |
| 7,697,480 B2* | 4/2010 | Marin et al. | 370/331 |
| 7,706,797 B2* | 4/2010 | Henttonen et al. | 455/436 |
| 2002/0160785 A1 | 10/2002 | Ovesjo et al. | |
| 2003/0013450 A1 | 1/2003 | Wang et al. | |
| 2006/0041686 A1* | 2/2006 | Caspi et al. | 709/248 |
| 2006/0171359 A1* | 8/2006 | Schwarz | 370/331 |
| 2007/0110009 A1 | 5/2007 | Bachmann et al. | |

FOREIGN PATENT DOCUMENTS

| | | |
|---|---|---|
| CN | 1350758 A | 5/2002 |
| CN | 1505413 A | 6/2004 |
| CN | 1555663 A | 12/2004 |
| CN | 1672454 A | 9/2005 |
| CN | 100461946 C | 2/2009 |
| CN | 100479588 C | 4/2009 |
| EP | 1 058 471 A2 | 12/2000 |
| EP | 1411740 A1 | 4/2004 |
| EP | 1 435 748 A1 | 7/2004 |
| EP | 1 531 645 A1 | 5/2005 |
| WO | WO 98/06226 A2 | 2/1998 |
| WO | WO 00/42808 A1 | 7/2000 |
| WO | 02/062084 A2 | 8/2002 |

OTHER PUBLICATIONS

International Searching Authority in corresponding PCT Application No. PCT/CN2006/001609 (Oct. 26, 2006).

1st Office Action in corresponding Chinese Application No. 200510082700.0 (Mar. 14, 2008).

2nd Office Action in corresponding Chinese Application No. 200510082700.0 (Jul. 4, 2008).

1st Office Action in corresponding Chinese Application No. 200510082801.8 (Apr. 25, 2008).

2nd Office Action in corresponding Chinese Application No. 200510082801.8 (Sep. 19, 2008).

"3GPP TS 23.009—3rd Generation Partnership Project; Technical Specification Group Core Network; Handover procedures (Release 4)," Dec. 2003, Version 4.9.0, 3rd Generation Partnership Project, Valbonne, France.

"3GPP TS 24.008—3rd Generation Partnership Project; Technical Specification Group Core Network and Terminals; Mobile radio interface Layer 3 specification; Core network protocols; Stage 3 (Release 4)," Dec. 2005, Version 4.16.0, 3rd Generation Partnership Project, Valbonne, France.

"3GPP TS 25.413—3rd Generation Partnership Project; Technical Specification Group Radio Access Network; UTRAN Iu interface RANAP signaling (Release 4)," Mar. 2004, Version 4.12.0, 3rd Generation Partnership Project, Valbonne, France.

"3GPP TS 48.008—3rd Generation Partnership Project; Technical Specification Group GSM/EDGE Radio Access Network; Mobile-services Switching Centre—Base Station System (MSC - BSS) interface; Layer 3 specification (Release 4)," Sep. 2003, Version 4.10.0, 3rd Generation Partnership Project, Valbonne, France.

"Draft ETSI EN 300 940—Digital cellular telecommunications system (Phase 2+); Mobile radio interface; Layer 3 specification (GSM 04.08 Version 5.17.0 Release 1996)," Jun. 2000, Version 5.17.0, 3rd Generation Partnership Project, Valbonne, France.

"Digital cellular telecommunications system (Phase 2+); Mobile-services Switching Centre—Base Station System (MSC - BSS) interface; Layer 3 specification (GSM 08.08 version 5.12.0 Release 1996)," Apr. 2000, Version 5.12.0, European Telecommunications Standards Institute, Valbonne, France.

Zhang, "Analysis on Interoperability between WCDMA and GSM Systems," Oct. 5, 2004, Heilongjiang Mobile Communication Company, Heilongjiang, China.

* cited by examiner

METHOD FOR INTER-SYSTEM HANDOVER

CROSS-REFERENCE TO RELATED APPLICATIONS

This application is a continuation of International Patent Application No. PCT/CN2006/001609, filed Jul. 7, 2006, which claims priority to Chinese Patent Application No. 200510082700.0, filed Jul. 8, 2005, and Chinese Patent Application No. 200510082801.8, filed Jul. 8, 2005, all of which are hereby incorporated by reference.

FIELD OF THE INVENTION

The present invention relates to a call handover technique in communication networks, and particularly to a method for handing over a 3rd Generation (3G) user terminal between 3G and 2nd Generation (2G) communication systems.

BACKGROUND OF THE INVENTION

In present communication systems, 2G and 3G communication systems coexist. Due to the mobility of a user terminal, it is possible for the user terminal to roam across two communication systems during a call process. Thus a handover between 2G and 3G communication systems is necessary to avoid interrupting the conversation of the user terminal moving between different communication systems.

In handing over a 3G user terminal from a 3G communication system to a 2G communication system, a mobile switching center (MSC) server in the 3G communication system will send handover-related information such as radio frequency capability (RFC) of the user terminal and a cell ID and so on to the 2G communication system so that the 2G communication system can handover the 3G user terminal successfully based on the received information.

Taking RFC as an example, in 2G communication systems, e.g. Global System for Mobile Communications (GSM) 900 or Data Cellular System (DCS) 1800, the value of RFC ranges from 0 to 4, while in 3G systems, such as Universal Mobile Telecommunications System (UMTS), 7 is designated as the value of RFC. Since 2G systems can not identify user terminals with 7 as RFC and 3G systems do not accept user terminals with RFC ranging from 0 to 4, it is impossible to hand over 3G mobile stations between 3G and 2G systems.

Similarly, in 2G communication systems such as GSM systems, the valid value of a cell ID identifier in a cell ID can only be one of Cell Global Identity (CGI) (0000 (binary)), Location Area Code Cell Identity (LAC_CI) (0001 (binary)) and CI (0010 (binary)). However, in 3G communication systems such as UMTS, the valid value of the cell ID identifier in UMTS can be one of CGI (0000 (binary)), LAC_CI (0001 (binary)), CI (0010 (binary)), Location Area Identity (LAI) (0100 (binary)), Location Area Code (LAC) (0101 (binary)), LAI_Radio Network Controller ID (RNC ID) (1000 (binary)), RNC ID (1001 (binary)), LAC_RNC ID (1010 (binary)) and Service Area Identifier (SAI) (1011 (binary)).

According to 3GPP TS 25413, when an RNC initiates a handover from a UMTS system to a GSM system, a serving cell ID (Source ID) takes SAI as its value, and the corresponding cell ID identifier is 1011 (binary) (SAI). In this way, for a mobile switching center (MSC) which has not been upgraded in a 2G communication system, a cell ID identifier with the value of 1011 cannot be dealt with, which leads to a failure in handover. In addition, when the cell ID identifier takes CGI as its value, the mobile network code (MNC) of the UMTS network may be different from the MNC of the existing 2G network MNC, which also leads to a failure in handover because the MSC/base station controller (BSC) in the 2G network cannot identify the serving cell ID.

It can be seen that defects of the existing method for inter-system handover of 3G user terminals lies in that the difference between the handover-related information supported by 3G systems and by 2G systems leads to unsuccessful handover.

SUMMARY

In view of the above, the present invention provides a method for inter-system handover to insure successful handover of user terminals from a serving communication system to a target communication system.

According to the present invention, a method for inter-system handover includes:

changing a first handover-related information into a second handover-related information, wherein the first handover-related information is supported by a serving communication system and the second handover-related information is supported by a target communication system; and handing over the user terminal from the serving communication system to the target communication system based on the second handover-related information.

According to the present invention, an apparatus for inter-system handover includes:

a first module, adapted to change a first handover-related information into a second handover-related information, wherein the first handover-related information is supported by a serving communication system and the second handover-related information is supported by a target communication system.

The present invention allows a user terminal to be successfully handed over to the target communication system. Furthermore, the present invention has the following features:

according to the present invention, a serving communication system apparatus or a target communication system apparatus changes the handover-related information in the serving communication system where the user terminal resides before handover into the handover-related information supported by the target communication system, thereby an operator can hand over user terminals successfully from a 3G network system to a 2G network system at a low cost and without updating the existing 2G MSC/BSC; in addition, the method in accordance with the embodiments of the present invention can insure successful handover between two networks without interrupting the users' conversation, which enhances the users' satisfaction; furthermore, the present invention makes use of the good resources of the existing 2G network to serve the users effectively at the beginning of building a 3G network, thus the competitiveness of 3G networks can be increased.

BRIEF DESCRIPTION OF THE DRAWINGS

The embodiments of the present invention are hereinafter described in detail with reference to the accompanying drawings so as to make the characteristics and merits of the present invention more apparent for those skilled in the art. Among the accompanying drawings.

EMBODIMENTS OF THE INVENTION

Preferred embodiments of the present invention are hereinafter described in detail with reference to the accompanying drawings and embodiments.

An embodiment of the present invention provides a method for inter-system handover. The method is based on the idea that, in handing over a user terminal from a serving communication system to a target communication system, the handover-related information in the serving communication system is changed into the handover-related information supported by the target communication system.

Figure 1:
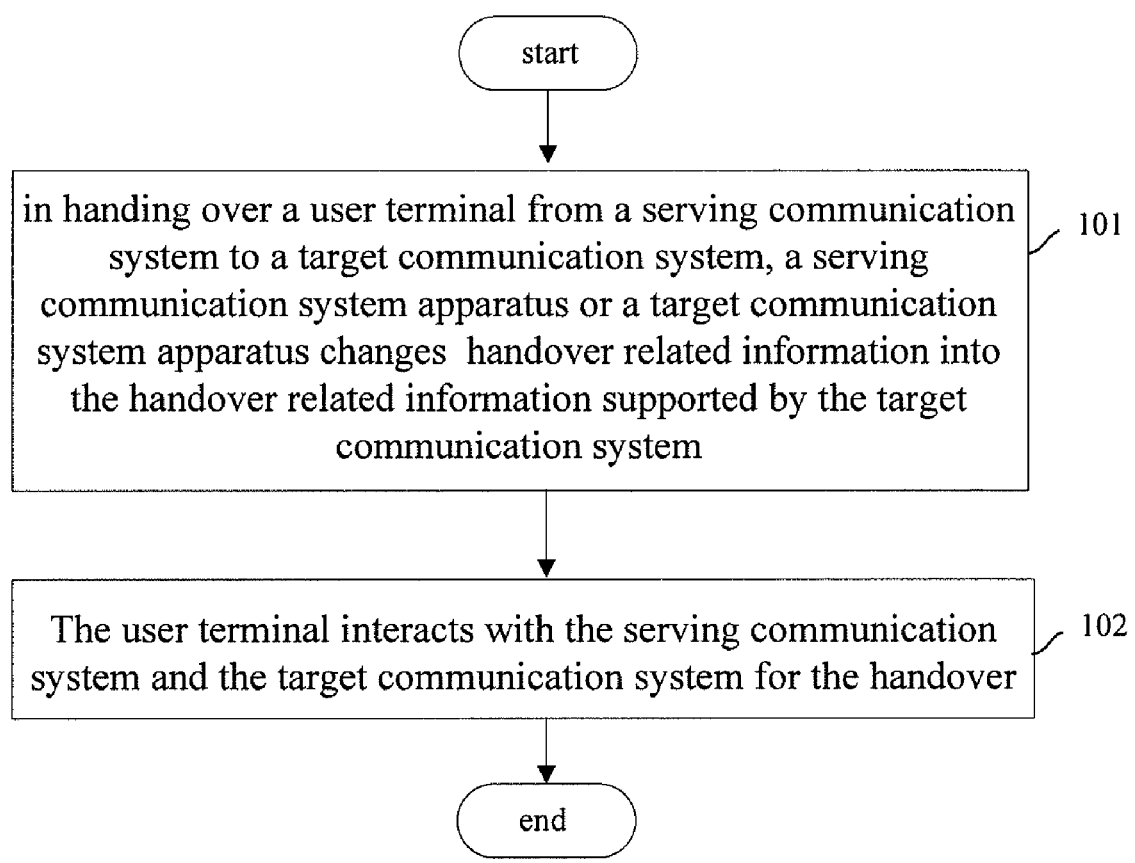
FIG. 1 is a flowchart illustrating a method for inter-system handover in accordance with an embodiment of the present invention.

FIG. 1 is a flowchart illustrating the method for inter-system handover in accordance with an embodiment of the present invention. As shown FIG. 1, the method includes the following steps.

In block 101, in handing over a user terminal from a serving communication system to a target communication system, a serving communication system apparatus or a target communication system apparatus changes the handover-related information in the serving communication system into the handover-related information supported by the target communication system.

In block 102, the user terminal interacts with the serving communication system and the target communication system for the handover.

In the examples of the present invention, when the serving communication system is a 3G communication system, the target communication system is a 2G communication system; alternatively, when the serving communication system is a 2G communication system, the target communication system is a 3G communication system. The handover-related information herein may include RFC indicating capabilities of the user terminal, and in such a case the identities of BSCs or RNCs and supported RFC of each cell in the 2G communication system are saved in a table of handover-related information corresponding relationships. The handover-related information may also include a cell ID and protocol versions supported by the BSC or RNC in the 2G communication system as well as a cell ID identifier which the BSC or RNC of any protocol version can identify, and the correlation between each 2G base station and the MNC of the 2G base station.

Two embodiments will hereinafter be described to illustrate the method for inter-system handover according to the present invention.

Embodiment 1

The embodiment takes a 3G communication system being the serving communication system and a 2G system being the target as an example. To achieve a successful inter-system handover of a 3G user terminal according to the embodiment, a table of handover-related information corresponding relationships is pre-configured in an apparatus of the serving communication system, i.e. the 3G communication system. The table maintains the identities of BSC or RNC and supported RFC of each cell in the 2G communication system when the handover-related information is the RFC of the user terminal, or the table maintains the protocol versions supported by each BSC or RNC in the 2G communication system, the cell ID identifier which can be identified by each BSC or RNC of each protocol version, and/or the correlation between each 2G base station and the MNC which the 2G base station belongs to when the handover-related information is the cell ID; or the table maintains simultaneously all of the above information when the handover-related information simultaneously includes the RFC of the user terminal and the cell ID. In addition, the apparatus in a UMTS system of 3G communication systems and the apparatus in a GSM system of 2G communication systems belong to the same switching office.

Figure 2:
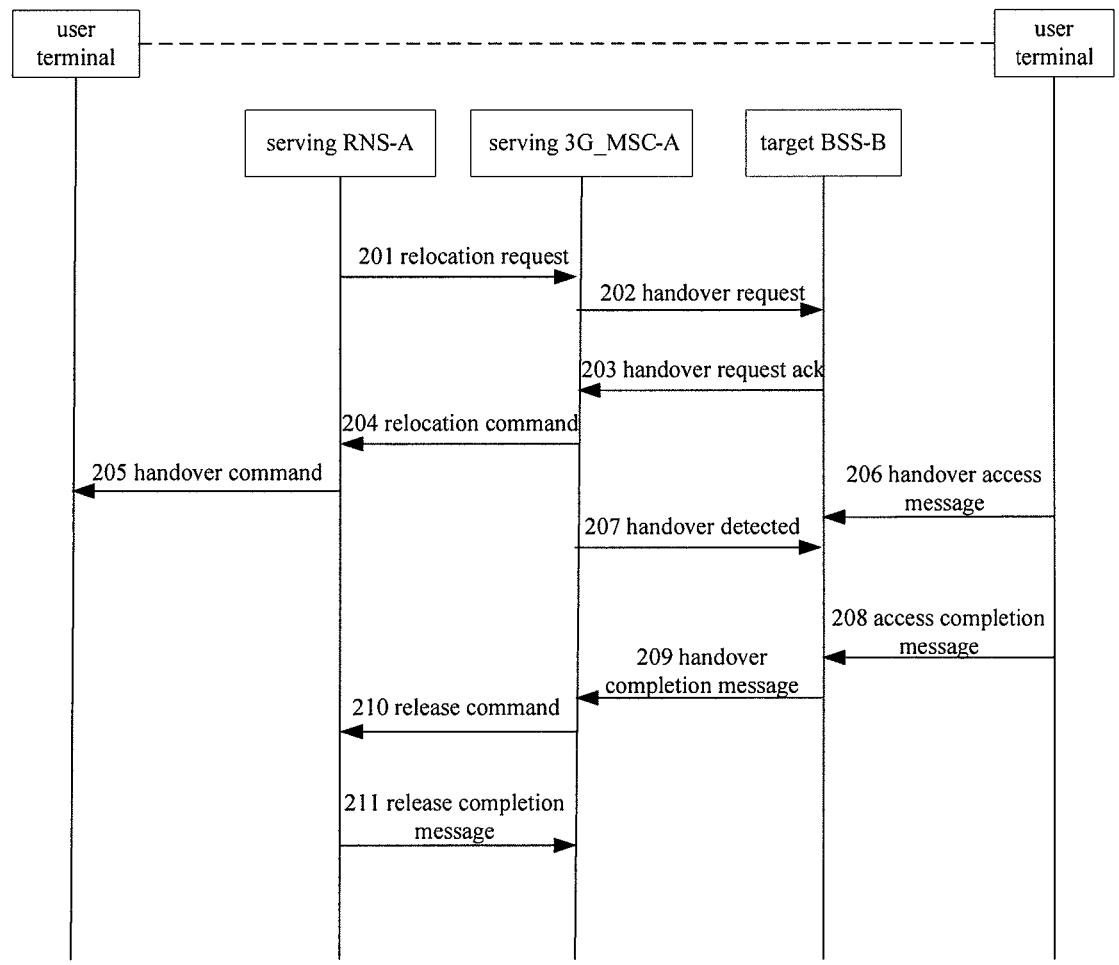
FIG. 2 is a flowchart illustrating a method for handover from a UMTS system to a GSM system in accordance with Embodiment 1 of the preset invention.

FIG. 2 is a flowchart illustrating the method for inter-system handover taking changing of the RFC executed by an MSC as an example. As shown FIG. 2, the method includes the following steps.

In block 201, for a user terminal in a conversation in the 3G communication system and in need of a handover, a radio network subsystem (RNS-A) sends a relocation request (Iu-Relocation-Required) to a serving MSC-A in the 3G communication system via an Iu interface requesting the serving MSC-A to execute a handover, wherein the relocation request contains handover-related information and a target cell ID.

In block 202, on receipt of the relocation request from the serving RNS-A, the serving MSC-A changes the handover-related information into the handover-related information supported by the 2G communication system according to the target cell ID and a table of handover-related information corresponding relationships, and loads the changed handover-related information into a handover request (A-Handover-Request) and sends the handover request to the target base station subsystem (BSS-B).

When the handover-related information is the RFC of the user terminal, changing the handover-related information in this block includes: parsing, by a serving communication system apparatus such as an MSC Server/MSC, the relocation request and obtaining the target cell ID; searching the table with the target cell ID as an index, and finding out the RFC supported by the BSC or the serving RNC of the target cell corresponding to the target cell ID; loading into the handover request the found RFC supported by the target cell BSC or RNC, and sending the handover request to the target BSS-B requesting the target BSS-B to prepare radio resources for the user terminal to be handed over.

When the handover-related information is a cell ID, changing the handover-related information in this step includes: determining, by the serving MSC-A, the protocol version of the 2G communication system, determining the target MSC and target BSC based on the relocation request, searching the table and obtaining the cell ID identifier which the target MSC and BSC can identify, and obtaining the MNC of the mobile network which the target MSC and the target BSC belong to; loading the found cell identifier and the MNC into the handover request, and sending the handover request to the target BSS-B.

The RFC and the cell ID may also be changed simultaneously in this step.

In block 203, the target BSS-B prepares radio resources, and returns a handover request acknowledgement (A-Handover-Request-Ack) to the serving MSC-A.

In blocks 204-205, the serving MSC-A sends a relocation command (Iu-Relocation-Command) to a serving RNS-A; the RNA-A sends a handover command (RRC-HO-Command) via the air interface to the user terminal requesting the user terminal to depart from the serving RNS-A and access the target BSS-B.

In blocks 206-209, the user terminal sends a handover access message (RI-HO-Access) via the air interface to the target BSS-B indicating that the user terminal is attempting to access the target BSS-B. And the target BSS-B sends a handover detected message (A-Handover-Detect) to the serving MSC-A indicating that the target BSS-B has detected the access attempt of the user terminal. Then the user terminal sends an access completion message (RI-HO-Complete) via the air interface indicating that the user terminal has accessed the target BSS-B successfully. After that, the BSS-B sends a handover completion message (A-Handover-Complete) to the serving MSC-A notifying the serving MSC-A of the successful handover of the user terminal needing the handover.

In blocks 210-211, the serving MSC-A sends a release command (Iu-Release-Command) to the RNS-A requesting the RNS-A to release the radio resources occupied by the previous conversation. After releasing the radio resources, the target RNS-A returns a resource release completion message (Iu-Release-Complete) to the serving MSC.

Thus, a handover from a UMTS system of 3G to a GSM system of 2G is completed.

Embodiment 2

Similar to Embodiment 1, in this embodiment, a table of handover-related information corresponding relationships is also pre-configured in an apparatus of the serving communication system, i.e. a 3G communication system. The table maintains identities of the BSCs or RNCs and supported RFC of each cell in the 2G communication system, and/or protocol versions supported by the BSCs or RNCs in the 2G communication system, cell ID identifiers which a BSC or RNC of each protocol version can identify, and the correlation between each 2G base station and the MNC which the 2G base station belongs to. In the present embodiment, the apparatus in the UMTS system of 3G and the apparatus in the GSM system of 2G do not belong to the same switching office.

Figure 3:
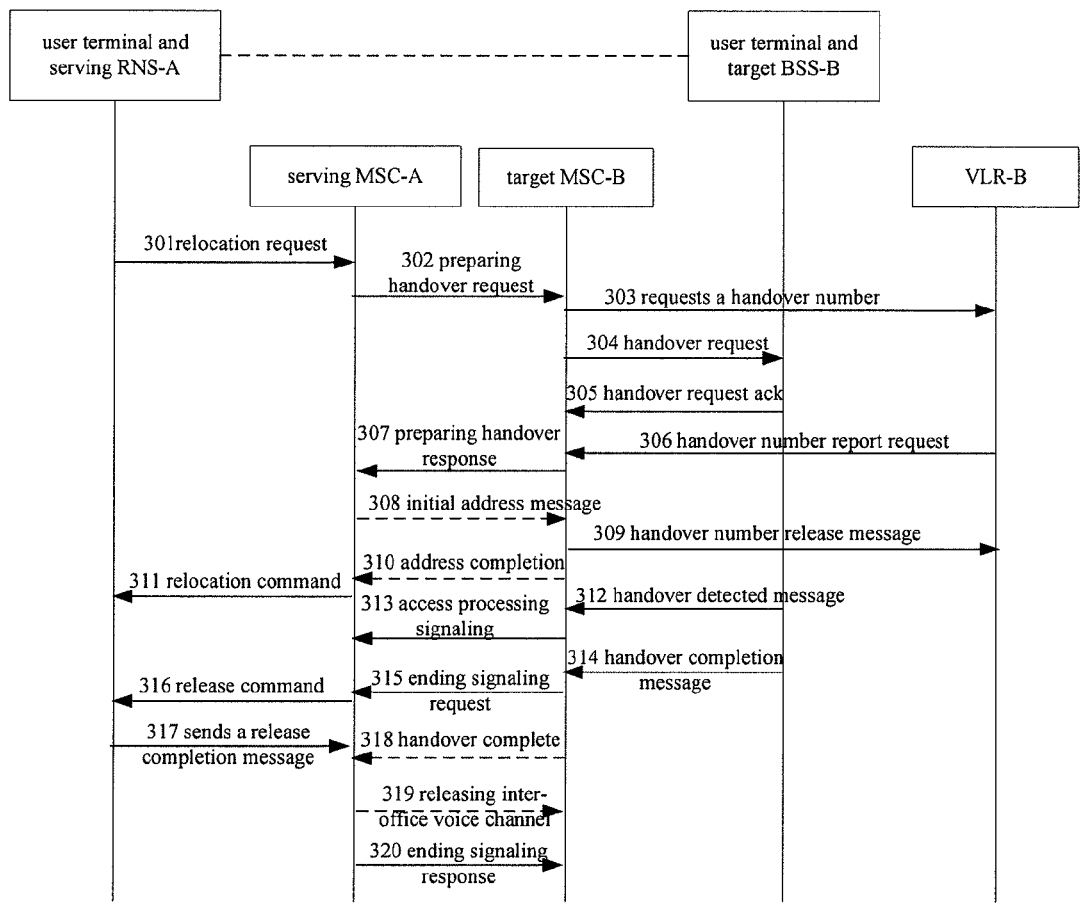
FIG. 3 is a flowchart illustrating a method for handover from a UMTS system to a GSM system in Embodiment 2 of the preset invention.

FIG. 3 is a flowchart illustrating a method for inter-system handover taking the changing of RFC executed by an MSC as an example. As shown in FIG. 3, the method includes the following steps.

In block 301, for a user terminal in a conversation in a 3G communication system and in need of a handover, an RNS-A sends a relocation request via an Iu interface to a serving MSC-A in the 3G communication system requesting the serving MSC-A to execute a handover, wherein the relocation request contains handover-related information and a target cell ID.

In block 302, the serving MSC-A changes the handover-related information into the handover-related information supported by the 2G communication system according to the target cell ID and the table of handover-related information corresponding relationships, and loads the changed handover-related information into a preparing handover request and sends the preparing handover request to a target MSC-B.

In this step, changing the handover-related information is the same with that in the step 202 of Embodiment 1.

After changing the handover-related information, the serving MSC-A generates a 2G handover request containing the changed handover-related information. Then, the serving MSC-A packs the handover request via an E interface in a MAP format to generate a preparing handover request (MAP-Prep-Handover req.), and sends the preparing handover request to the target MSC-B which the target BSC belongs to.

In blocks 303-305, on receipt of the MAP-Prep-Handover req. message, the target MSC-B requests a handover number from a visitor location register (VLR-B) preparing for establishing a voice channel from the MSC-A of 3G to the target MSC-B, i.e. preparing for an initial address message (IAM). The target MSC-B sends a handover request to the target BSS-B requesting the target BSS-B to prepare radio resources for the user terminal needing a handover. After finishing preparing the radio resources, the target BSS returns an acknowledgement to the serving MSC-A.

In blocks 306-307, the VLR-B sends to the target MSC-B a handover number report request (MAP-Send-Handover-Number-Report req.) containing the allocated handover number. The target MSC-B, according to the received handover number allocated by the VLR-B and the handover request acknowledgement, constructs and sends a preparing handover response (Map-Prep-Handover resp.) to the serving MSC-A indicating that the radio resources and the handover number are ready.

In blocks 308-311, the serving MSC-A analyzes the handover number returned by the MSC-B and establishes a voice channel between two MSCs, and sends the initial address message to the MSC-B. The MSC-B sends a handover number release (MAP-Send-Handover-Number-Report resp.) message to release the handover number allocated which may be used by other users for handover. The target MSC-B returns an address completion message to the serving MSC-A indicating that the voice channel between the two MSCs has been established. And the serving MSC-A sends a relocation command to the RNS-A requesting the user terminal to depart from the serving RNS-A and access the target BSS-B.

In blocks 312-313, after the user terminal sends a handover access message over an air interface, the BSS-B sends a handover detected message to the MSC-B notifying the MSC-B of the detected access attempt of the user terminal. The MSC-B forwards the handover detected message to the serving MSC-A via an access processing signaling (MAP-Process-Access-Signal Req.) message indicating that the MS intends to access the 2G network.

In blocks 314-317, after the user terminal has accessed the 2G network, the BSS-B sends a handover completion message to the MSC-B notifying the MSC-B of the successful access of the user terminal. Then the MSC-B forwards the handover completion message to the serving MSC-A via an ending signaling request (MAP-Send-End-Signal Req.) indicating that the user terminal has successfully accessed the 2G network. And on receipt of the ending signaling request, the serving MSC-A sends a release command to the serving RNS-A requesting the serving RNS-A to release the radio resources occupied by the previous conversation. The RNS-A sends a release completion message notifying the serving MSC-A of the releasing of the radio resources occupied by the previous conversation.

In blocks 318-320, the MSC-B notifies the serving MSC-A, over a relay interface through an ANSWER message for example, of the completion of the handover to keep the integrity of relay signaling. When the call is over, the serving MSC-A notifies the MSC-B of the releasing of the inter-office voice channel through a RELEASE message. The serving MSC-A sends an ending signaling response (MAP-Send-End-Signal resp.) message requesting the MSC-B to release the radio resources requested for the handover.

Thus, an inter-office handover from a 3G UMTS system to a 2G GSM system is completed.

In another embodiment, a table of handover-related information corresponding relationships may also be pre-configured in a target MSC-B, then the related information may be changed by the target MSC-B in block 303.

In the process shown in FIGS. 2 and 3, the handover-related information is changed by the MSC/MSC Server. According to the same conversion rule, the network entity for conversion may also be a Radio Network Controller (RNC) in the serving communication network. In such case, the table is saved in the RNC of the 3G communication network. And in blocks 201 and 301, the RNC first executes the changing and then loads the changed handover-related information in a relocation request and sends the request to the serving MSC-A.

It can be seen from the above embodiments, a serving communication system apparatus or a target communication system apparatus changes the handover-related information of the 3G user terminal in the serving communication system where the user terminal resides before handover into the handover-related information supported by the target communication system. Thus an operator can successfully handover user terminals from a 3G network system to a 2G network system at a low cost and without updating the existing 2G MSC/BSC. In addition, the method in accordance with the embodiments of the present invention can insure successful handover of user terminals between two networks without interrupting the users' conversation, which enhances satisfaction of the users. Furthermore, the method makes full use of the resources in the existing 2G networks at the beginning of building a 3G network and provides effective service for the users so as to increase the competitiveness of the 3G network.

The foregoing are only preferred embodiments of the present invention and are not used for limiting the protection scope thereof. All modifications, equivalent replacements or improvements in accordance with the spirit and principles of the present invention shall be included in the protection scope of the present invention.

The invention claimed is:

1. A method for inter-system handover, comprising:
receiving a first handover-related information sent by a user terminal when the user terminal is in need of a handover;
changing the first handover-related information into a second handover-related information, wherein the first handover-related information is supported by a serving communication system and the second handover-related information is supported by a target communication system; and
handing over the user terminal from the serving communication system to the target communication system based on the second handover-related information;
wherein the handover-related information is radio frequency capability (RFC) of the user terminal, and changing the first handover-related information into the second handover-related information comprises:
searching a table for the RFC of the user terminal supported by a target cell and an identity of a base station controller (BSC) or a radio network controller (RNC) of the target cell, wherein the table maintains the BSC or RNC of at least one cell in the target communication system and the RFC supported by the cell, and the target cell is the cell to which the user terminal is to be handed over; and
changing the RFC of the user terminal in the serving communication system into the RFC searched out.

2. The method of claim 1, wherein the handover-related information is a cell ID identifier, and
changing the first handover-related information into the second handover-related information comprises:
searching a table of handover-related information corresponding relationships based on a protocol version of the target communication system for a cell ID identifier which the BSC or the RNC of the protocol version in the target cell can identify, wherein the table maintains at least one protocol version supported by at least one BSC or RNC in the target communication system, and the target cell is the cell to which the user terminal is to be handed over; and
changing the cell ID identifier in the serving communication system into the cell ID identifier searched out.

3. The method of claim 1, wherein the handover-related information is a mobile network code, MNC, and
changing the first handover-related information into the second handover-related information comprises:
searching a table of handover-related information corresponding relationships for a mobile switching center, MSC, or a BSC to obtain the MNC corresponding to the MSC or the BSC, wherein the table maintains the MNC to which a base station in the target communication system belongs; and
changing the MNC in the serving communication system into the MNC searched out.

4. The method of claim 1, wherein changing the first handover-related information into the second handover-related information comprises:
sending, by a serving radio network subsystem, RNC, in the serving communication system, the first handover-related information to a serving MSC/MSC Server in the serving communication system,
changing, by the serving MSC/MSC Server, the first handover-related information into the second handover-related information,
sending, by the serving MSC/MSC Server, the second handover-related information to the target communication system.

5. The method of claim 1, wherein changing the first handover-related information into the second handover-related information comprises:
changing, by a serving RNC in the serving communication system, the first handover-related information into the second handover-related information, and
sending, by the serving RNC via a serving radio network subsystem, RNS, the second handover-related information to a serving MSC/MSC Server in the serving communication system.

6. The method of claim 1, wherein changing the first handover-related information into the second handover-related information comprises:
sending, by a serving RNS in the serving communication system, the first handover-related information to a serving MSC/MSC Server in the serving communication system,
sending, by the serving MSC/MSC Server, the handover-related information to a target MSC,
changing, by the target MSC, the first handover-related information into the second handover-related information.

7. The method of claim 4, wherein handing over the user terminal from the serving communication system to the target communication system based on the second handover-related information comprises:
sending, by the serving MSC/MSC Server, the second handover-related information in a handover request to a target base station subsystem, BSS, in the target communication system,
preparing, by the target BSS, radio resources according to the received handover request;
requesting, by the serving MSC/MSC Server via the serving RNS, the user terminal to access the target BSS and depart from the serving RNS;
accessing, by the user terminal, the target base station subsystem.

8. The method of claim 5, wherein handing over the user terminal from the serving communication system to the target communication system based on the second handover-related information comprises:

sending, by the serving MSC/MSC Server, the second handover-related information in a handover request to a target base station subsystem, BSS, in the target communication system, preparing, by the target BSS, radio resources according to the received handover request;

requesting, by the serving MSC/MSC Server via the serving RNS, the user terminal to access the target BSS and depart from the serving RNS;

accessing, by the user terminal, the target base station subsystem.

9. The method of claim 4, wherein handing over the user terminal from the serving communication system to the target communication system based on the second handover-related information comprises:

sending, by the serving MSC/MSC Server, the second handover-related information in a preparing handover request, to a target MSC in the target communication system, requesting, by the target MSC, a handover number from a visitor location registers, VLR, and preparing, by the target BSS, radio resources for the user terminal as requested by the target MSC;

sending, by the VLR, to the target MSC a handover number report request containing an allocated handover number, informing, by the target MSC, the serving MSC/MSC Server that the radio resources and the handover number are ready;

establishing, by the serving MSC/MSC Server, an inter-office voice channel to the target MSC and sending an initial address message to the target MSC, requesting, by the target MSC, the VLR to release the allocated handover number and informing the serving MSC/MSC Server that the voice channel between the two MSC has been established, and requesting, by the serving MSC/MSC Server via the serving RNS, the user terminal to access the target BSS;

accessing, by the user terminal, the target BSS.

10. The method of claim 5, wherein handing over the user terminal from the serving communication system to the target communication system based on the second handover-related information comprises:

sending, by the serving MSC/MSC Server, the second handover-related information in a preparing handover request, to a target MSC in the target communication system, requesting, by the target MSC, a handover number from a visitor location registers, VLR, and preparing, by the target BSS, radio resources for the user terminal as requested by the target MSC;

sending, by the VLR, to the target MSC a handover number report request containing an allocated handover number, informing, by the target MSC, the serving MSC/MSC Server that the radio resources and the handover number are ready;

establishing, by the serving MSC/MSC Server, an inter-office voice channel to the target MSC and sending an initial address message to the target MSC, requesting, by the target MSC, the VLR to release the allocated handover number and informing the serving MSC/MSC Server that the voice channel between the two MSC has been established, and requesting, by the serving MSC/MSC Server via the serving RNS, the user terminal to access the target BSS;

accessing, by the user terminal, the target BSS.

11. The method of claim 6, wherein handing over the user terminal from the serving communication system to the target communication system based on the second handover-related information comprises:

requesting, by a target MSC, a handover number from a visitor location register, VLR, according to the second handover-related information; and preparing, by the target BSS, radio resources for the user terminal as requested by the target MSC;

sending, by the VLR, to the target MSC a handover number report request containing an allocated handover number, and informing, by the target MSC, the serving MSC/MSC Server that the radio resources and the handover number are ready;

establishing, by the serving MSC/MSC Server, an inter-office voice channel to the target MSC and sending an initial address message to the target MSC, requesting, by the target MSC, the VLR to release the allocated handover number and informing the serving MSC/MSC Server that the voice channel between the two MSCs has been established, requesting, by the serving MSC/MSC Server via the serving RNS, the user terminal to access the target BSS;

accessing, by the user terminal, the target BSS.

12. An apparatus for inter-system handover, comprising:

a first module, adapted to receive a first handover-related information sent by a user terminal when the user terminal is in need of a handover, change the first handover-related information into a second handover-related information, wherein the first handover-related information is supported by a serving communication system and the second handover-related information is supported by a target communication system;

a second module, adapted to handover the user terminal from the serving communication system to the target communication system based on the changed handover-related information;

wherein the first module is adapted to search a table for a radio frequency capability (RFC) of the user terminal supported by a target cell and an identity of a base station controller (BSC) or a radio network controller (RNC) of the target cell, wherein the table maintains the BSC or RNC of at least one cell in the target communication system and the RFC supported by the cell, and the target cell is the cell to which the user terminal is to be handed over; and adapted to change the RFC of the user terminal in the serving communication system into the RFC searched out.

13. The apparatus of claim 12, wherein the first module is adapted to search a table of handover-related information corresponding relationships based on a protocol version of the target communication system for a cell ID identifier which the BSC or the RNC of the protocol version in the target cell can identify, wherein the table maintains at least one protocol version supported by at least one BSC or RNC in the target communication system, and the target cell is the cell to which the user terminal is to be handed over; and adapted to change the cell ID identifier in the serving communication system into the cell ID identifier searched out.

14. The apparatus of claim 12, wherein the first module is adapted to search a table of handover-related information corresponding relationships for a mobile switching center, MSC, or a BSC to obtain a mobile network code, MNC, corresponding to the MSC or the BSC, wherein the table maintains the MNC to which a base station in the target communication system belongs; and adapted to change the MNC in the serving communication system into the MNC searched out.

* * * * *